United States Patent
Santra et al.

(10) Patent No.: US 9,850,167 B2
(45) Date of Patent: Dec. 26, 2017

(54) CARBON DIOXIDE-RESISTANT PORTLAND BASED CEMENT COMPOSITION

(75) Inventors: Ashok K. Santra, Norman, OK (US); David Kulakofsky, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1771 days.

(21) Appl. No.: 13/223,081

(22) Filed: Aug. 31, 2011

(65) Prior Publication Data

US 2013/0048284 A1   Feb. 28, 2013

(51) Int. Cl.
| | | |
|---|---|---|
| E21B 43/17 | (2006.01) |
| C04B 28/04 | (2006.01) |
| C04B 28/02 | (2006.01) |
| C09K 8/594 | (2006.01) |
| C09K 8/467 | (2006.01) |
| C04B 103/00 | (2006.01) |

(52) U.S. Cl.
CPC ............ *C04B 28/04* (2013.01); *C04B 28/021* (2013.01); *C09K 8/467* (2013.01); *C09K 8/594* (2013.01); *C04B 2103/0035* (2013.01); *C04B 2103/0036* (2013.01)

(58) Field of Classification Search
CPC ......... C04B 7/02; C04B 7/243; E21B 43/164; E21B 43/17
USPC ....................................................... 166/292
See application file for complete search history.

(56) References Cited

U.S. PATENT DOCUMENTS

| | | | |
|---|---|---|---|
| 4,635,724 A * | 1/1987 | Bruckdorfer et al. ........ 166/268 |
| 5,383,521 A | 1/1995 | Onan et al. |
| 5,435,843 A | 7/1995 | Roy et al. |
| 5,573,588 A | 11/1996 | Carrasquillo |
| 5,921,319 A | 7/1999 | Curtice |
| 6,562,122 B2 | 5/2003 | Dao et al. |
| 6,776,237 B2 | 8/2004 | Dao et al. |
| 7,077,203 B1 | 7/2006 | Roddy et al. |
| 7,413,014 B2 | 8/2008 | Chatterji et al. |
| 7,445,669 B2 | 11/2008 | Roddy et al. |
| 7,607,482 B2 | 10/2009 | Roddy et al. |

(Continued)

FOREIGN PATENT DOCUMENTS

WO   WO 03031364 A1   4/2003

OTHER PUBLICATIONS

Chun et al., Carbon dioxide sequestration in concrete in different curing environments, UWM Center for By-Products Utilization, University of Wisconsin-Milwaukee, Milwaukee, WI, 2006.

(Continued)

*Primary Examiner* — Doug Hutton, Jr.
*Assistant Examiner* — Ashish Varma
(74) *Attorney, Agent, or Firm* — McAfee & Taft

(57) ABSTRACT

The invention provides a carbon dioxide-resistant hydraulic cement composition. The inventive composition comprises a Portland cement, Class C fly ash and water. The Class C fly ash is present in the composition in an amount in the range of from about 5% to less than about 30% by weight based on the total weight of the cementitious components in the composition. In another aspect, the invention provides a method of cementing in a carbon dioxide environment. In yet another aspect, the invention provides a method of enhancing the recovery of a hydrocarbon fluid from a subterranean formation.

11 Claims, 2 Drawing Sheets

(56) References Cited

U.S. PATENT DOCUMENTS 7,736,430 B2    6/2010    Barron et al.

OTHER PUBLICATIONS

Collepardi et al., The Influence of Slag and Fly Ash on the Carbonation of Concrete, ACI Special Publications vol. 221, Jan. 1, 2004, pp. 483-493.

Onan, D.D., Effects of Supercritical Carbon Dioxide on Well Cements, 1984 Permian Basin Oil & Gas Recovery Conference, Midland, TX, Mar. 8-9, 1984, pp. 1-15, Society of Petroleum Engineers of AIME.

Bruckdorfer, R., Carbon Dioxide Corrosion Resistance to Cements, $36^{th}$ Annual Technical Meeting of the Petroleum Society of CIM held Jointly with the Canadian Society of Petroleum Geologists in Edmonton, CA, Jun. 2-5, 1985, pp. 517-525, Petroleum Society of CIM.

Santra, Ashok et al., Reaction of $CO_2$ with Portland Cement at Downhole Conditions and the Role of Pozzolanic Supplements, 2009 SPE International Symposium on Oilfield Chemistry in The Woodlands, Texas, Apr. 20-22, 2009, pp. 1-9, Society of Petroleum Engineers.

Halliburton Energy Services, Inc., Halad®-344 Fluid Loss Additive, 2007, pp. 1-2, currently published on Internet at www.Halliburton.com.

Halliburton Energy Services, Inc., D-Air 3000™ and D-Air 3000L™ Defoamers, 2007, p. 1, currently published on Internet at www.Halliburton.com.

Halliburton Energy Services, Inc., D-Air 4000™ Cementing Defoamer, 2007, p.1, currently published on Internet at www.Halliburton.com.

* cited by examiner

CARBON DIOXIDE-RESISTANT PORTLAND BASED CEMENT COMPOSITION

BACKGROUND OF THE INVENTION

Hydraulic cement compositions are often used in applications that are or will be associated with a relatively high level of carbon dioxide. For example, hydraulic cement compositions are used to encase the well bores of injection and production wells used in connection with enhanced oil recovery techniques. A fluid commonly used to flood the formation in such techniques is carbon dioxide. Specifically, the carbon dioxide is injected into the formation together with water through one or more injection wells to drive hydrocarbons in the formation toward one or more production wells. This technique has proved to be effective in increasing production of the hydrocarbons from the formation.

Hydraulic cement compositions are also used in other applications that involve or may involve a carbon dioxide environment. Examples include formation sealing applications and other cementing applications associated with oil, gas, water and geothermal wells and carbon capsule storage applications associated with power plants.

A problem that can result from the use of hydraulic cement compositions in applications that are or will be associated with a carbon dioxide environment is corrosion of the hydraulic cement by carbonic acid and other corrosive compounds formed by reactions between the carbon dioxide, water and potentially other compounds in the environment. Carbonic acid and other corrosive compounds formed from carbon dioxide can react with and penetrate into hardened hydraulic cement thereby lowering the compressive strength thereof. For example, carbonic acid corrosion can cause the production casing of an oil and gas well to fail resulting in undesired migration of fluids between the formation and well bore and other serious problems. Similar problems and adverse consequences can occur in other applications in which hydraulic cement compositions are used in carbon dioxide environments.

There is a need for a hydraulic cement composition that is resistant to corrosion by carbonic acid in downhole and other environments and that can be used in effective and efficient manners.

BRIEF SUMMARY OF THE INVENTION

Figure 1:
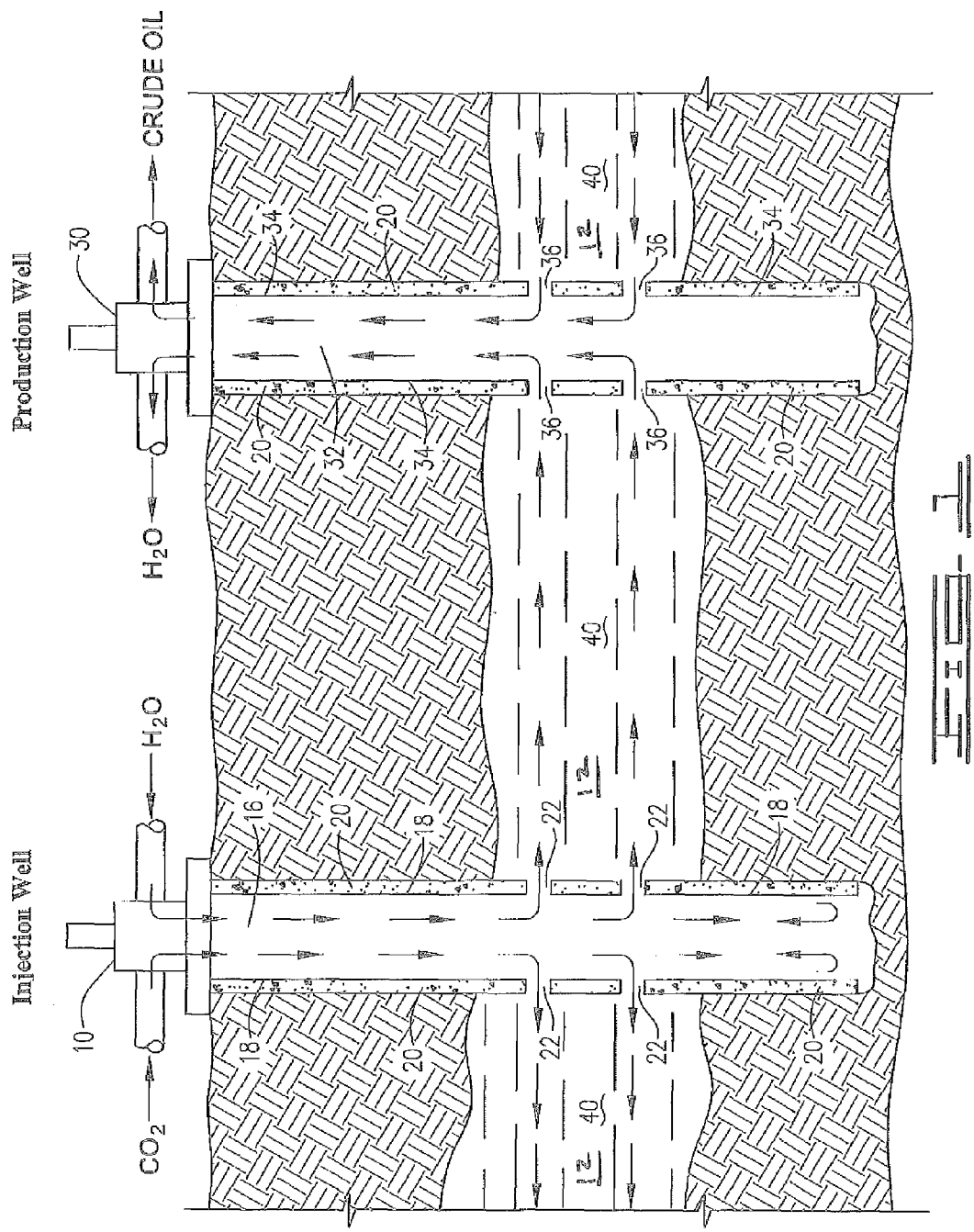
FIG. 1 is a schematic cross-sectional view illustrating one embodiment of the inventive method of enhancing the recovery of a hydrocarbon from a subterranean formation.

In one aspect, the invention provides a carbon dioxide-resistant hydraulic cement composition. The inventive carbon dioxide-resistant hydraulic cement composition comprises a Portland cement, Class C fly ash and water. The Class C fly ash is present in the composition in an amount in the range of from about 5% to less than about 30% by weight based on the total weight of the cementitious components in the composition. The water is present in the composition in an amount sufficient to form a slurry.

In another aspect, the invention provides a method of cementing in a carbon dioxide environment. The inventive method of cementing in a carbon dioxide environment comprises the steps of preparing a carbon dioxide-resistant hydraulic cement composition, placing the carbon dioxide-resistant hydraulic cement composition in the carbon dioxide environment, and allowing the carbon dioxide-resistant hydraulic cement composition to set.

The carbon dioxide-resistant hydraulic cement composition utilized in the inventive method of cementing in a carbon dioxide environment includes a Portland cement, Class C fly ash, and water. The Class C fly ash is present in the composition in an amount in the range of from about 5% to less than about 30% by weight based on the total weight of the cementitious components in the composition. The water is present in the composition in an amount sufficient to form a slurry.

In yet another aspect, the invention provides a method of enhancing the recovery of a hydrocarbon from a subterranean formation. The inventive method of enhancing the recovery of a hydrocarbon from a subterranean formation comprises the steps of: (a) placing one or more injection wells into the subterranean formation, the injection well(s) including a casing cemented into place using a hydraulic cement composition; (b) placing one or more production wells into the subterranean formation, the production well(s) including a casing cemented into place using a hydraulic cement composition; and (c) injecting a flooding composition including carbon dioxide and water through one or more of the injection wells into the subterranean formation in order to pressurize the subterranean formation and drive the hydrocarbon toward the production well(s).

The hydraulic cement composition utilized to cement the casing into place in at least one of the injection well(s) and production well(s) is a carbon dioxide corrosion-resistant hydraulic cement composition. The carbon dioxide corrosion-resistant hydraulic cement composition includes a Portland cement, Class C fly ash and water. The Class C fly ash is present in the composition in an amount in the range of from about 5% to less than about 30% by weight based on the total weight of the cementitious components of the composition. The water is present in the composition in an amount sufficient to form a slurry.

DETAILED DESCRIPTION

The invention includes a carbon dioxide-resistant hydraulic cement composition, a method of cementing in a carbon dioxide environment (the "inventive cementing method"), and a method of enhancing the recovery of a hydrocarbon fluid from a subterranean formation (the "inventive recovery enhancing method"). The inventive carbon dioxide-resistant hydraulic cement composition is utilized in both the inventive cementing method and the inventive recovery enhancing method.

As used herein and in the appended claims, a carbon dioxide environment means an environment that contains or may contain an amount of carbon dioxide capable of causing corrosion to hydraulic cement. For example, a carbon dioxide environment can be an environment that already includes carbon dioxide and water (for example, a subterranean area that contains carbon dioxide and water, and in which a carbon storage capsule is placed) or an environment that may be subjected to or otherwise include carbon dioxide and water in the future (for example, a subterranean formation in which carbon dioxide and water are subsequently injected in connection with an enhanced oil recovery operation).

The inventive carbon dioxide-resistant hydraulic cement composition comprises a Portland cement, Class C fly ash and water. The water is present in the composition in an amount sufficient to form a slurry.

The Portland cement utilized in the inventive composition is preferably selected from Class G type Portland cement and Class H type Portland cement as classified according to *API Specification for Materials and Testing* (API Specification 10A), published by The American Petroleum Institute (hereinafter "API Class G (or API Class H) type Portland cement"). More preferably, the Portland cement utilized in the inventive composition is API Class H type Portland cement.

Fly ash is very fine ash produced by the combustion of powdered coal. The Class C fly ash utilized in the inventive composition is Class C fly ash as defined in ASTM Specification C 618. Class C fly ash has pozzolanic and cementitious properties. The Class C fly ash is present in the composition in an amount in the range of from about 5% to less than about 30% by weight, preferably in the range of from about 15% to about 28% by weight, and most preferably about 25% by weight, based on the total weight of the cementitious components in the composition. As used herein and in the appended claims, a cementitious component is a component that has the properties of hydraulic cement in that it chemically combines with other ingredients to form a hydrated cement. As used herein and in the appended claims, the expressed percents by weight of the Class C fly ash and Portland cement are based on a dry weight basis.

In one embodiment, the cementitious components utilized in the inventive composition are Portland cement and Class C fly ash. Accordingly, in this embodiment, the Class C fly ash is present in the composition in an amount in the range of from about 5% to less than about 30% by weight, preferably in the range of from about 15% to about 28% by weight, and most preferably about 25% by weight, based on the total weight of the Portland cement and the Class C fly ash present in the composition.

Additional components can optionally be included in the inventive composition depending on the application. For example, in one embodiment, a fluid loss additive is included in the composition. An example of a suitable fluid loss additive is Halad®-344, a fluid loss additive marketed by Halliburton Energy Services, Inc. and comprising a random copolymer of 2-acrylamide-2-propane sulfonic acid and N,N-dimethyl acrylamide. A defoamer can also be used in the inventive composition. An example of a suitable de-foaming agent is D-AIR 3000L™, a defoamer marketed by Halliburton Energy Services, Inc. and comprising an internal olefin ($C_{14}$-$C_{18}$), an alkaline hydrophobic precipitated silica, and polypropylene glycol 4000. Other components that can be utilized in the inventive composition include retarding agents, accelerating agents, silica, elastomers, fibers, hollow beads and foaming agents. The particular additives and the amount of such additives utilized will depend on the particular application.

The components of the inventive composition are admixed together to form a pumpable slurry. The density of the slurry can vary depending on the application. Generally, the density of the slurry is in the range of from about 12 to about 19 pounds per gallon of water in the slurry. The slurry ultimately hardens and sets into a carbon dioxide corrosion-resistant hydraulic cement.

The inventive cementing method comprises the steps of preparing a carbon dioxide-resistant hydraulic cement composition, placing the carbon dioxide-resistant hydraulic cement composition in the carbon dioxide environment, and allowing the carbon dioxide-resistant hydraulic cement composition to set. The carbon dioxide-resistant hydraulic cement composition utilized in the inventive cementing method is the inventive carbon dioxide-resistant hydraulic cement composition.

The inventive cementing method can be used in connection with any cementing application involving a carbon dioxide environment. Examples include cementing applications involving wells (for example, oil, gas, water, and geothermal wells) penetrating subterranean formations, including primary cementing applications, formations sealing and consolidation applications, formation of cement plugs for various purposes, and remedial cementing applications. Other cementing applications involving a carbon dioxide environment and in which the inventive cementing method can be utilized include the formation of underground cement capsules for storing carbon from power plants and cementing applications used in connection with in situ combustion techniques used in connection with coal gasification.

The inventive recovery enhancing method can be utilized to enhance the production of a hydrocarbon (such as crude oil and/or natural gas) from partially depleted reservoirs thereof. The inventive recovery enhancing method comprises the steps of: (a) placing one or more injection wells into the subterranean formation, the injection well(s) including a casing cemented into place using a hydraulic cement composition; (b) placing one or more production wells into the subterranean formation, the production well(s) including a casing cemented into place using a hydraulic cement composition; and (c) injecting a flooding composition including carbon dioxide and water through one or more of the injection wells into the subterranean formation in order to pressurize the subterranean formation and drive the hydrocarbon toward the production well(s). The hydrocarbon and typically water are then produced through the production well(s).

The production well(s) and injection well(s) can be placed into the subterranean formation by drilling and completion techniques known in the art. Typically, a plurality of injection wells and production wells are placed in an oil field (which can include several acres) adjacent to the subterranean formation(s) of interest. The injection and production wells are strategically positioned and spaced apart in the oil field to effectively and efficiently utilize the pressure created by flooding the formation to drive the hydrocarbon from the injection well(s) toward the production well(s).

The hydraulic cement composition utilized in the inventive recovery enhancing method to cement the casing into place in at least one of the production well(s) and injection well(s) is the inventive carbon dioxide corrosion-resistant hydraulic cement composition. The inventive composition is preferably utilized to cement the casing into place in all of the production wells and injection wells utilized in the inventive recovery enhancing method. Ideally, the inventive composition is used in connection with all of the cementing applications carried out in association with the inventive recovery enhancing method.

In cementing the casing into place, the inventive cement composition is typically pumped through the tubular casing and forced into the annular space between the outside of the casing and the wall of the wellbore. The inventive composition then hardens and sets to bond the casing in the wellbore and effectively seal the casing from the formation and carbonic acid and other corrosive fluids that may be present therein.

After the inventive cement composition is set, one or more perforations are formed in the casing and hardened cement to allow fluids to flow between the injection and production wells and the formation. For example, components used to flood the formation can be injected through perforation(s) in the injection well(s) into the formation. Hydrocarbons, water and other fluids can be forced from the formation through the perforation(s) into the production well(s).

Methods of enhancing the recovery of a hydrocarbon fluid from a subterranean formation by injecting a flooding composition including carbon dioxide and water through one or more injection wells into the subterranean formation in order to pressurize the formation and drive a hydrocarbon (for example, crude oil and/or natural gas) toward one or more production wells are well known. The flooding composition can be injected through the injection well(s) by alternating the injection of water and carbon dioxide (water alternating gas (WAG) techniques) or by simultaneously injecting water and carbon dioxide (simultaneous water and gas injection (SWAG) techniques).

Flooding the formation with carbon dioxide and water exposes the cement utilized to seal the casings of the production well(s) and injection well(s) into place and in connection with other applications associated with the wells to carbonic acid and possibly other corrosive compounds. For example, carbonic acid, $H_2CO_3$, readily forms by reaction of carbon dioxide and water. Other potentially corrosive compounds can be formed by reactions between the carbon dioxide or carbonic acid with other compounds in the formation.

Referring now to FIG. 1, an embodiment of the inventive method of enhancing the recovery of a hydrocarbon fluid from a subterranean formation is illustrated. FIG. 1 schematically designates a subterranean formation 12 that contains a hydrocarbon (in this case a crude oil) deposit therein.

First, an injection well 10 is placed in the subterranean formation 12 by drilling a wellbore 16 therein. A metal tubular casing 18 is placed into the wellbore 16 and cemented into place therein with the inventive carbon dioxide corrosion-resistant hydraulic cement composition 20. After the cement composition has set, perforations 22 are formed in the casing 18 and hardened cement composition 20 in the area of the subterranean formation 12 to allow the injection well 10 to fluidly communicate with the formation.

A production well 30 is also placed in the subterranean formation 12 by drilling a wellbore 32 therein. A metal tubular casing 34 is placed into the wellbore 32 and cemented into place therein with the inventive carbon dioxide corrosion-resistant hydraulic cement composition 20. After the cement composition has set, perforations 36 are formed in the casing 34 and hardened cement composition 20 in the area of the subterranean formation 12 to allow the production well 30 to fluidly communicate with the formation.

Next, carbon dioxide and water are injected into the subterranean formation 12 through the injection well 10. The carbon dioxide and water forms a flooding composition 40 in the subterranean formation 12 that functions to pressurize the formation and drive the hydrocarbons (crude oil in this case) present therein toward and into the production well 30. The oil and water are then produced from the production well 30. Due to the fact that the cement utilized to cement the casings of the production and injection wells into place is the inventive composition, the cement effectively resists corrosion by the carbon dioxide injected into the formation and related compounds formed thereby.

Many advantages are achieved by the inventive compositions and methods. For example, the inventive carbon dioxide-resistant hydraulic cement composition is very effective in resisting corrosion by high concentrations of carbon dioxide in water under harsh temperature and pressure conditions even though it includes a relatively low amount of Class C fly ash (when compared to certain prior carbon dioxide-resistant hydraulic cement compositions). In fact, in accordance with the invention, it has been discovered that a relatively low amount of Class C fly ash (when compared to certain prior carbon dioxide-resistant hydraulic cement compositions) actually provides better resistance to carbonic acid penetration into set hydraulic cement compositions. The inventive composition is very effective in connection with the high temperatures, high pressures and other harsh conditions that are typically associated with downhole environments.

The present invention is exemplified by the following example, which is given by way of example only and should not be taken as limiting of the present invention in any way.

Example 1

The inventive carbon dioxide-resistant hydraulic cement composition was tested in the laboratory for its ability to form hardened hydraulic cement capable of withstanding corrosion by carbon dioxide. Specifically, the effect of varying the amount of the Class C fly ash utilized in the composition on the carbon dioxide corrosion resistance of the hardened cement samples was evaluated.

Each cement slurry was tested according to API Specification 10, Section 5. First, various hydraulic cement composition slurries including the inventive carbon dioxide-resistant hydraulic cement composition were prepared by admixing Class H Portland cement, Class C fly ash (except in formulation No. 1, the control sample), a fluid loss additive (Halad-344), a defoamer (D-Air 3000 L) and distilled water together to form a slurry. The components and density of the slurries are shown by Table 1 below.

TABLE 1

Hydraulic Cement Slurry Formulations

| Formulation | Sample No. 1 | Sample No. 2 | Sample No. 3 | Sample No. 4 |
|---|---|---|---|---|
| Portland cement[1] | 100% | 75% | 65% | 50% |
| Class C fly ash[2] | 0 | 25% | 35% | 50% |
| Halad ®-344[3] | 0.25% | 0.25% | 0.25% | 0.25% |
| D-AIR 3000L ™[4] | 0.05 g/sk | 0.05 g/sk | 0.05 g/sk | 0.05 g/sk |
| Water[5] | 39% | 36% | 34.5% | 32.6% |
| Density[6] | 16.4 ppg | 16.4 ppg | 16.4 ppg | 16.4 ppg |

[1]API Class H type Portland cement. The percent by weight is based on the total weight of the Portland cement and Class C fly ash (based on a dry weight basis).
[2]Class C fly ash as defined in ASTM Specification C 618. The percent by weight is based on the total weight of the Portland cement and Class C fly ash (based on a dry weight basis).
[3]A fluid loss additive sold by Halliburton Company and comprising a random copolymer of 2-acrylamide-2-propane sulfonic acid and N,N-dimethyl acrylamide. The listed percent is the percent by weight based on the total weight of the composition (based on a dry weight basis).
[4]A defoamer marketed by Halliburton Company and comprising an internal olefin ($C_{14}$-$C_{18}$), an alkaline hydrophobic precipitated silica, and polypropylene glycol 4000. The recited measurement is in terms of grams per sack of cement.
[5]Distilled water. The listed percent is the percent by weight based on the total weight of the Portland cement and Class C fly ash (based on a dry weight basis).
[6]Pounds per gallon Cylindrical cement core samples of each slurry formulation (No. 1-No. 4) were then formed. Each core sample was 1½ inches in diameter and 2½ long and formed by injecting the corresponding slurry into a plastic mold and allowing the slurry to harden therein. Each slurry was slowly poured into the mold and stirred therein to remove any trapped air. The plastic molds were then sealed with rubber stoppers and the samples were cured in the molds for 15 days at a temperature of 200° F. and a pressure of 2000 psi.

Following the curing period, the core samples were removed from the molds by placing the molds in warm water to expand the plastic and pushing the cores therefrom. Utilizing the above procedure, two cement cores were formed for each formulation (No. 1-No. 4).

A first set of the cores (including one of each formulation (No. 1-No. 4)) was placed into a first autoclave. A second set of cores (including one of each formulation (No. 1-No. 4)) was placed in the second autoclave. The samples were then carbonated for 15 days in autoclave No. 1 and 30 days in autoclave No. 2 as follows: The chamber of each autoclave was filled with water and sealed. Liquid carbon dioxide was then continuously injected into the water in each chamber throughout the test periods using a sparge tube connected to a carbon dioxide tank. The chambers of the autoclaves were maintained at 200° F. The liquid carbon dioxide was injected into each chamber at a pressure of 2000 psi throughout the test periods.

Following each test period (15 days for autoclave No. 1; 30 days for autoclave No. 2), the cement core samples were removed and analyzed for carbon dioxide penetration depth therein. The depth of carbon dioxide (carbonic acid) penetration into the core samples was determined as follows: First, each cement core sample was cut in half along its longitudinal axis. Each core sample was then submerged in a 1% phenolphthalein solution. The phenolphthalein solution turned a portion of each core sample to the color purple which designated the portion of the sample that included calcium hydroxide; that is, the portion that had not reacted with carbon dioxide (carbonic acid). By measuring the thickness of the gray portion of the sample, the carbon dioxide (carbonic acid) penetration depth could be determined. The depth of the carbon dioxide (carbonic acid) penetration in the core samples was representative of the resistance (or lack of resistance) of the core samples to corrosion by carbon dioxide (carbonic acid) under conditions similar to the conditions encountered in downhole environments.

Figure 2:
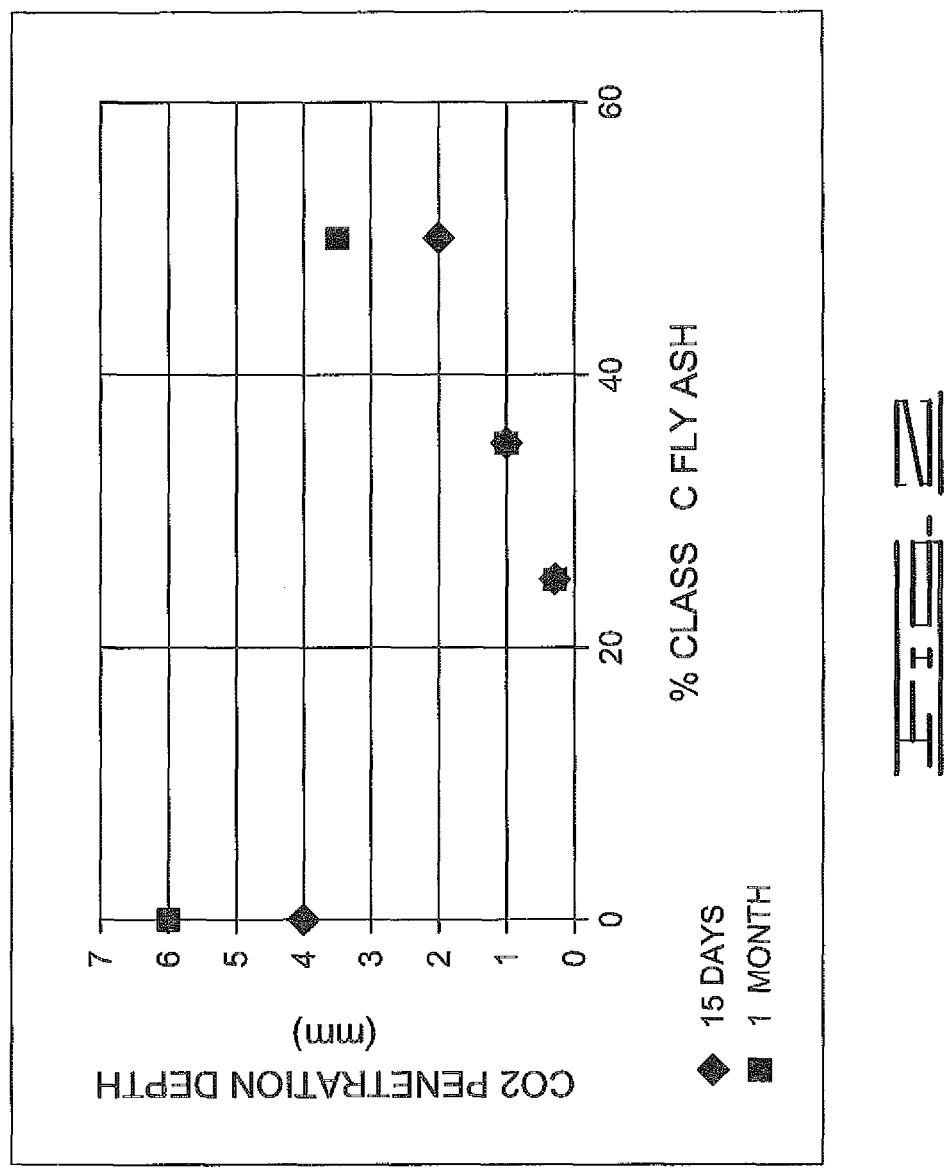
FIG. 2 is a graph corresponding to Example 1.

The results of the tests are shown illustrated by FIG. 2 and shown by Table 2 below.

TABLE 2

$CO_2$ Penetration Depth Following 15 and 30 Days of Treatment

| Percent Class C Fly Ash[1] | 15 Days Penetration Depth | 30 Days Penetration Depth |
|---|---|---|
| 0% | 4 mm | 6 mm |
| 25% | 0.25 mm | 0.25 mm |
| 35% | 1 mm | 1 mm |
| 50% | 2 mm | 3.5 mm |

[1]Class C fly ash as defined in ASTM Specification C 618. The percent by weight is based on the total weight of the Portland cement and Class C fly ash (based on a dry weight basis).

The above results show that the Class C fly ash significantly improved the resistance of the cement core samples to penetration (and corrosion) by carbon dioxide (carbonic acid). The results also show, surprisingly, that the degree of penetration (and corresponding degree of corrosion) by carbon dioxide (carbonic acid) decreased as the amount of Class C fly ash in the composition decreased. For example, the carbon dioxide (carbonic acid) penetration depth in the samples utilizing 25% by weight Class C fly ash (0.25 mm) was significantly less than the carbon dioxide (carbonic acid) penetration depth in the core samples formed using 35% by weight Class C fly ash.

Thus, the present invention is well adapted to carry out the objects and attain the ends and advantages mentioned as well as those which are inherent therein.

What is claimed is:

1. A method of cementing in a carbon dioxide environment, comprising:
   preparing a carbon dioxide-resistant hydraulic cement composition, said carbon dioxide-resistant hydraulic cement composition including:
   a Portland cement;
   Class C fly ash present in an amount in a range of from 5% to less than 30% by weight based on the total weight the cementitious components in said composition; and
   water present in an amount sufficient to form a slurry;
   placing said carbon dioxide-resistant hydraulic cement composition in said carbon dioxide environment; and
   allowing said carbon dioxide-resistant hydraulic cement composition to set.

2. The method of claim 1, wherein said Portland cement of said carbon dioxide-resistant hydraulic cement composition is selected from API Class G type Portland cement and API Class H type Portland cement.

3. The method of claim 2, wherein said Portland cement of said carbon dioxide-resistant hydraulic cement composition is API Class H type Portland cement.

4. The method of claim 1, wherein said Class C fly ash is present in said composition in an amount in the range of from 15% to 28% by weight based on the total weight the cementitious components in said composition.

5. The method of claim 1, wherein said Class C fly ash is present in said composition in an amount of from 5% to less than 30% by weight based on the total weight of said Portland cement and Class C fly ash in said composition.

6. A method of enhancing the recovery of a hydrocarbon from a subterranean formation, comprising:
   placing one or more injection wells into said subterranean formation, said injection well including a casing cemented into place using a hydraulic cement composition;
   placing one or more production wells into said subterranean formation, said production well(s) including a casing cemented into place using a hydraulic cement composition;
   injecting a flooding composition including carbon dioxide and water through one or more of said injection wells into said subterranean formation in order to pressurize said subterranean formation and drive said hydrocarbon toward said production well(s), wherein said hydraulic cement composition utilized to cement the casing into place in at least one of said injection well(s) and said production well(s) is a carbon dioxide corrosion-resistant hydraulic cement composition that includes:
   a Portland cement;
   Class C fly ash present in an amount in a range of from 5% to less than 30% by weight based on the total weight the cementitious components in said composition; and
   water present in an amount sufficient to form a slurry.

7. The method of claim 6, wherein said Portland cement of said carbon dioxide-resistant hydraulic cement composition is selected from API Class G type Portland cement and API Class H type Portland cement.

8. The method of claim 7, wherein said Portland cement of said carbon dioxide-resistant hydraulic cement composition is API Class H type Portland cement.

9. The method of claim 6, wherein said carbon dioxide-resistant hydraulic cement composition further comprises a fluid loss additive.

10. The method of claim 6, wherein said Class C fly ash is present in said composition in an amount in the range of from 15% to 28% by weight based on the total weight the cementitious components in said composition.

11. The method of claim 10, wherein said Class C fly ash is present in said composition in an amount of from 5% to less than 30% by weight based on the total weight of said Portland cement and Class C fly ash in said composition.

\* \* \* \* \*